No. 628,327. Patented July 4, 1899.
G. P. B. HOYT.
ROTARY ENGINE.
(Application filed July 13, 1898.)
(No Model.)

WITNESSES:
Donn Twitchell
Geo. J. Hosten

INVENTOR
G. P. B. Hoyt
BY
ATTORNEYS.

THE NORRIS PETERS CO., PHOTO-LITHO., WASHINGTON, D. C.

UNITED STATES PATENT OFFICE.

GABRIEL P. B. HOYT, OF NEW YORK, N. Y.

ROTARY ENGINE.

SPECIFICATION forming part of Letters Patent No. 628,327, dated July 4, 1899.

Application filed July 13, 1898. Serial No. 685,820. (No model.)

*To all whom it may concern:*

Be it known that I, GABRIEL P. B. HOYT, of the city of New York, (Jamaica,) in the borough of Queens, in the county of Queens and State of New York, have invented a new and Improved Rotary Engine, of which the following is a full, clear, and exact description.

The object of the invention is to provide a new and improved packing, more especially designed for use on rotary engines, the packing being simple and durable in construction, adapted to last a long time, and to form a secure joint between the contact parts to prevent leakage of the motive agent or other fluid.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1:
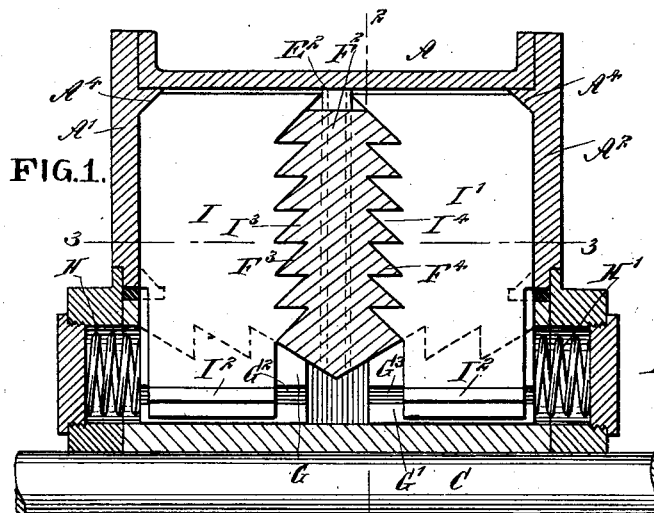
Figure 2:
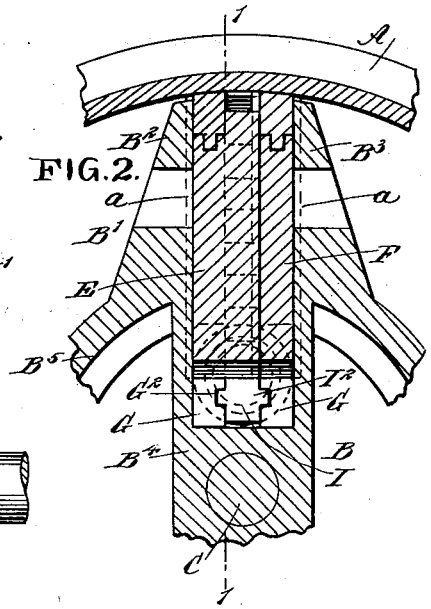
Figure 3:
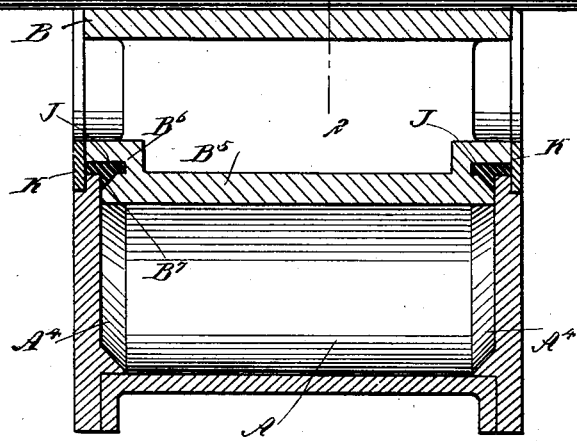
Figure 4:
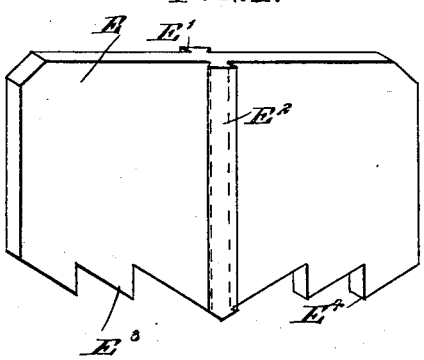
Figure 5:
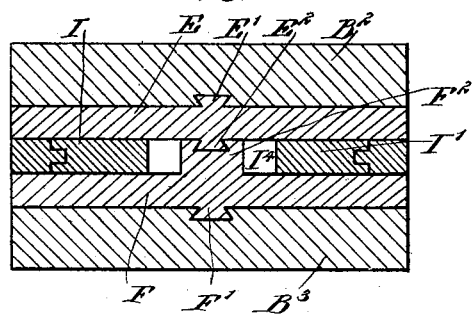

Figure 1 is a sectional side elevation of a rotary engine having my improvement applied, the section being taken on the line 1 1 in Fig. 2. Fig. 2 is a fragmentary transverse section of the same on the line 2 2 in Fig. 1. Fig. 3 is a fragmentary sectional plan view of the same on the line 3 3 in Fig. 1. Fig. 4 is a perspective view of one of the packing members, and Fig. 5 is a like view of one of the spring-pressed slides for actuating the packing members.

The improved packing illustrated in the drawings is applied to a rotary engine having a cylinder A and a piston B secured to the main driving-shaft C, the piston being provided with a piston-head B', against which the motive agent acts to rotate the piston in the cylinder. The piston-packing is fitted into a recess formed between the opposite walls $B^2$ and $B^3$ of the piston-head and between the heads A' and $A^2$ of the cylinder, the piston-packing extending into the web $B^4$ of the piston close to the hub thereof, as will be readily understood by reference to Figs. 1 and 2. The packing comprises packing members E and F in the form of plates for engaging and packing the inner surface of the cylinder A, said packing members being provided at their outer faces with dovetails E' and F', respectively, fitted to slide in corresponding dovetail grooves formed on the inner faces of the walls $B^2$ $B^3$ of the piston-head B'. The packing member F is further provided at the inner face and near the middle thereof with an offset $F^2$, having a dovetailed groove engaged by a dovetail $E^2$, formed on the inner face of the member E directly opposite the dovetail E' and in alinement therewith and the dovetail F'. Thus the two members E and F are fitted to slide outwardly on the walls $B^2$ and $B^3$ and are also fitted to slide upon one another.

In order to move the packing-rings E and F simultaneously outward, I provide sets of slides G G', fitted to slide in the bottom of the slot for the packing in the piston B, the said slides being provided at their top edges with inclines or teeth $G^2$, engaging corresponding teeth $E^3$ $E^4$ on the under side of the packing member E, and similar teeth or inclines are formed on the under side of the other packing member F, which latter is in this respect similar to the packing member E. Springs H and H' press on the outer ends of the slides G G', so as to force the latter inwardly and cause their inclines $G^2$ to act on the corresponding inclines of the packing members E and F and force the same outward in contact with the inner surface of the cylinder A. The springs H H' are held in suitable recesses in the heads A' and $A^2$ of the cylinder, as is plainly illustrated in Fig. 1, a suitable plug being employed for giving access to each recess and the corresponding spring whenever necessary.

Between the packing members E and F are arranged packing members I I', adapted to move outwardly in a longitudinal direction to engage with their side edges the inner faces of the heads A' $A^2$ and pack the same. These packing members I I' are moved at a right angle to the members E and F and are actuated from the outwardly-moving member F, the latter being for this purpose provided on opposite sides of its offset $F^2$ with inclines or teeth $F^3$ $F^4$, engaging corresponding inclines or teeth $I^3$ $I^4$, formed on the inner edges of the packing members I I'.

Now it is evident that when the member F is moved outward by the action of the spring-pressed slides G G' then the inclines $F^3$ and F⁴ act simultaneously on the packing members I I', so that the latter are forced in a longitudinal direction away from each other to pack the inner faces of the heads A' A². The packing members I I' are formed near their lower ends with longitudinally-extending ribs $I^2$, fitting into corresponding guideways $G^3$, formed on the inner faces of the slides G G'. The outer corners of the packing members are preferably beveled, as is plainly indicated in Fig. 1, to fit on corresponding annular shoulders $A^4$ on the heads A' A² of the cylinder.

The walls $B^2$ and $B^3$ of the piston-head are formed with openings, as plainly shown in Fig. 2 at $a$, to allow the motive agent to press directly upon the plates E and F to hold the latter in the outward packing position caused by the action of the springs when no pressure is on or when the piston-head passes the ports.

With respect to the terms "packing-plates" in the claims I desire it to be understood that these terms are employed in their broader sense as designating packing elements or members and not necessarily the plates of the specified form shown in the drawings.

Having thus fully described my invention, I claim as new and desire to secure by Letters Patent—

1. A rotary engine having a cylinder, a rotary piston mounted therein and provided with a head contacting with the inner walls of the cylinder, two packing-plates secured to each other and fitted to slide in the head, two additional packing-plates located between the two first-named packing members and engaged therewith so as to be spread longitudinally with the axis of the piston, as the first-named packing-plates move transversely to said axis, slides mounted in the head and having inclined surfaces engaging the first-named packing-plates, to push the same outward transverse to the axis of the piston, and means for pushing the slides.

2. In a packing, the combination with the part that carries the same, of two pairs of packing members or plates, the first pair being mounted to slide together in one direction and the second pair being mounted to slide transversely to the first pair and oppositely to each other, an offset formed on one of the first-named packing-plates and having inclined surfaces engaging the second-named packing-plates, to push the second packing-plates opposite to each other, the slides engaging the first-named packing-plates, to push the same outwardly, and means for moving the slides.

3. In a packing, the combination with the part that carries the same, of two sets of plates, the plates of the first set being mounted to move in one direction and the plates of the second set being mounted to move transversely to the first set, the packing-plates having engaging inclined surfaces by which to move the plates of the second set of plates as the first set moves, and means for pushing the said first set of plates.

4. In a packing, the combination with the part that carries the same, of two packing-plates having dovetail connection with each other and mounted to slide on the said member, one of the packing-plates having an offset provided with inclined surfaces at each side, two additional packing-plates respectively engaging the said inclined surface of one of the first-named plates, and means for sliding the first-named plates.

5. In a packing, the combination with the part that carries the same, of a packing-plate mounted to slide outwardly, two additional packing-plates mounted to slide transversely to the first plate and oppositely to each other, the packing-plates having inclined engaging surfaces by which to move the second-named plates upon the movement of the first-named plate, and means for sliding the said first-named plate.

6. In a packing, the combination with the part that carries the same, of a packing-plate mounted to slide, a second packing-plate mounted to slide transversely to the first packing-plate, the two plates having engaging inclined surfaces by which to move the second plate upon the movement of the first plate, and means for sliding the first-named plate.

7. In a packing, the combination with the part that carries the same, of a packing-plate mounted to slide, a second packing-plate mounted to slide transversely to the first packing-plate, the two plates having inclined engaging surfaces by which to move the second plate upon the movement of the first plate, and a slide having an inclined surface engaging with the first plate, to push the same.

8. In a rotary engine, the combination of a cylinder, a rotary piston mounted therein and having a head engaging the inner walls of the cylinder, a packing-plate mounted on the head to slide transversely to the axis of the piston, a second packing-plate mounted on the head to slide longitudinally with the axis of the piston, a slide mounted on the head and engaging the first-named plate, to move the same outwardly, said first-named plate having an inclined surface bearing against the second plate, to push the same, and means carried on the piston for moving the slide.

GABRIEL P. B. HOYT.

Witnesses:
THEO. G. HOSTER,
EVERARD BOLTON MARSHALL.